US011400958B1

(12) United States Patent
Fu et al.

(10) Patent No.: US 11,400,958 B1
(45) Date of Patent: Aug. 2, 2022

(54) LEARNING TO IDENTIFY SAFETY-CRITICAL SCENARIOS FOR AN AUTONOMOUS VEHICLE

(71) Applicant: Motional AD LLC, Boston, MA (US)

(72) Inventors: James Guo Ming Fu, Singapore (SG); Scott D. Pendleton, Singapore (SG); You Hong Eng, Singapore (SG); Yu Pan, Singapore (SG); Jiong Yang, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/479,197

(22) Filed: Sep. 20, 2021

(51) Int. Cl.
*B60W 60/00* (2020.01)
*B60W 50/02* (2012.01)
*G06N 3/08* (2006.01)
*G06V 20/56* (2022.01)
*B60W 50/00* (2006.01)

(52) U.S. Cl.
CPC .. *B60W 60/00186* (2020.02); *B60W 50/0205* (2013.01); *G06N 3/08* (2013.01); *G06V 20/56* (2022.01); *B60W 2050/0062* (2013.01); *B60W 2554/80* (2020.02)

(58) Field of Classification Search
CPC ....... B60W 60/00186; B60W 30/0956; B60W 30/0953; B60W 30/095; B60W 30/18159; G01C 21/3602; G06N 3/0445; G05D 1/0221; G06F 17/50
See application file for complete search history.

(56) References Cited

U.S. PATENT DOCUMENTS 9,015,093 B1 * 4/2015 Commons .......... G01C 21/3602
706/26
2016/0179093 A1 6/2016 Prokhorov
(Continued)

FOREIGN PATENT DOCUMENTS

CN 103942359 A * 7/2014 ............. G06F 17/50
DE 102019202634 7/2020

OTHER PUBLICATIONS

[No Author Listed], "SAE: Surface Vehicle Recommended Practice, Taxonomy and Definitions for Terms Related to Driving Automation Systems for On-Road Motor Vehicles," SAE International, Sep. 30, 2016, 30 pages.
(Continued)

*Primary Examiner* — Yuri Kan P. E.
(74) *Attorney, Agent, or Firm* — Fish & Richardson P.C.

(57) ABSTRACT

Provided are methods for learning to identify safety-critical scenarios for autonomous vehicles. First state information representing a first state of a driving scenario is received. The information includes a state of a vehicle and a state of an agent in the vehicle's environment. The first state information is processed with a neural network to determine at least one action to be performed by the agent, including a perception degradation action causing misperception of the agent by a perception system of the vehicle. Second state information representing a second state of the driving scenario is received after performance of the at least one action. A reward for the action is determined. First and second distances between the vehicle and the agent are determined and compared to determine the reward for the at least one action. At least one weight of the neural network is adjusted based on the reward.

20 Claims, 10 Drawing Sheets

(56) References Cited

U.S. PATENT DOCUMENTS

2019/0225214 A1* 7/2019 Pohl .................... B60W 30/095
2020/0133282 A1   4/2020 Choi et al.
2020/0278681 A1   9/2020 Gier et al.
2020/0307564 A1* 10/2020 Rahimi ................ G06N 3/0445
2020/0361482 A1   11/2020 Choi et al.
2021/0053569 A1* 2/2021 Censi .............. B60W 30/18159
2021/0114627 A1   4/2021 McCurrie
2021/0213977 A1* 7/2021 Aragon ............. B60W 30/0953
2021/0284147 A1* 9/2021 Phan .................... G05D 1/0221
2021/0370990 A1* 12/2021 Wulfe ............... B60W 30/0956

OTHER PUBLICATIONS

Office Action in United Kingdom Appln. No. GB2118276.1, dated May 30, 2022, 5 pages.

* cited by examiner

LEARNING TO IDENTIFY SAFETY-CRITICAL SCENARIOS FOR AN AUTONOMOUS VEHICLE

BACKGROUND

The development of an autonomous vehicle (AV) includes the challenge of identifying scenarios that accurately capture perception degradation at the outside of an operational envelope of the AV. For example, at the edge of the operational envelope of the AV, there may be scenarios which are not modeled in the software that controls the operation of the AV. Identified scenarios are used, for example, to improve the navigation by the AV around other objects that may present a safety concern for the AV or its occupant(s). An example of perception degradation is object flicker in which an object may temporarily "disappear" behind another object as the AV moves toward the object. Object flicker applies, for example, to a pedestrian walking behind a car toward traffic in which the AV is operating and/or approaching.

DETAILED DESCRIPTION

Figure 1:
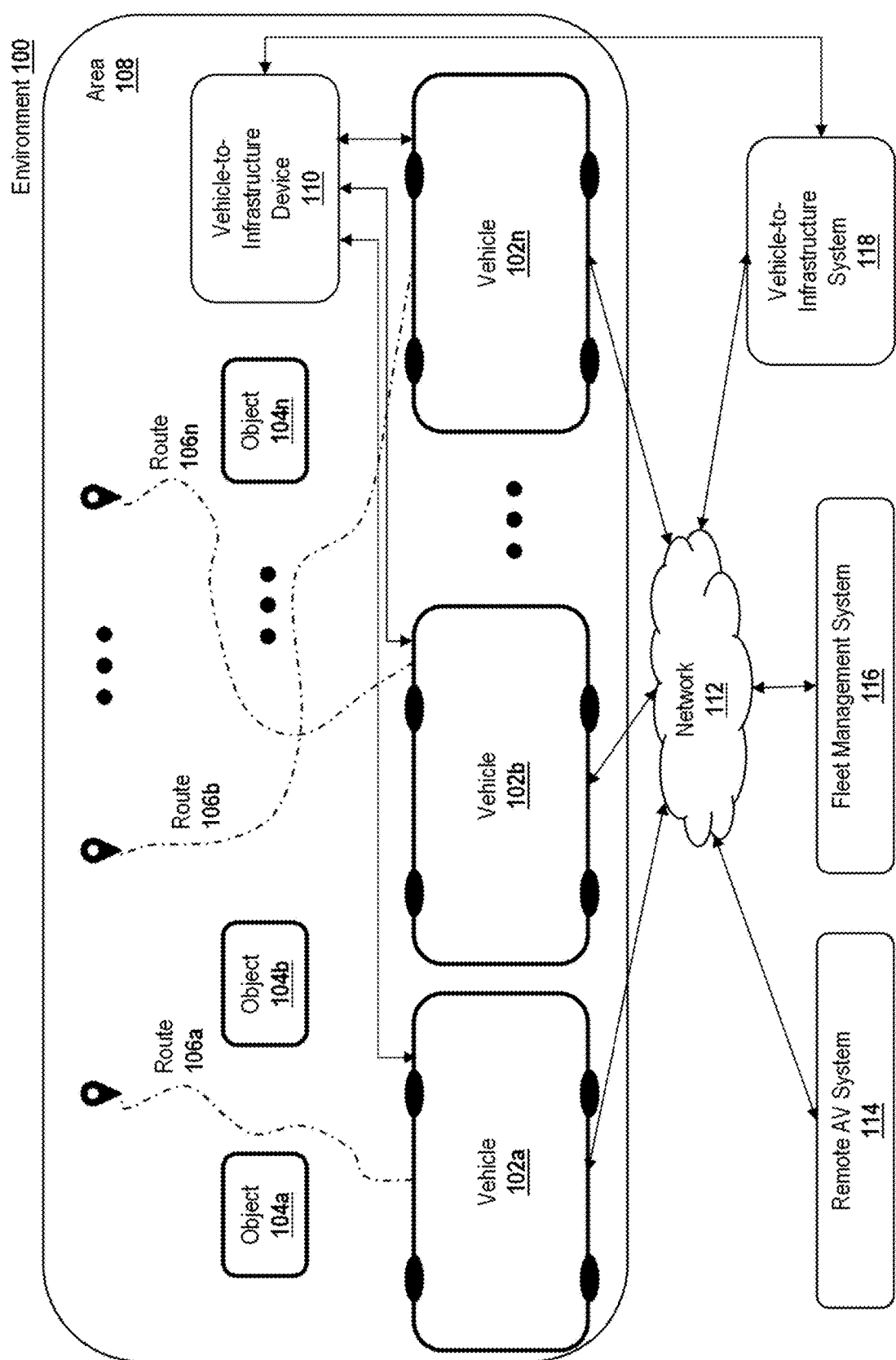
FIG. 1 is an example environment in which a vehicle including one or more components of an autonomous system are implemented.

In the following description, numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, engines, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement the following. First state information representing a first state of a driving scenario is received by at least one processor. The first state information includes a state of a vehicle and a state of an agent in an environment of the vehicle. The first state information is processed with a neural network by the at least one processor to determine at least one action to be performed by the agent. The at least one action includes a perception degradation action causing misperception of the agent by a perception system of the vehicle. Second state information representing a second state of the driving scenario is received by the at least one processor after performance of the at least one action by the agent. A reward for the at least one action is determined by the at least one processor, including the following. A first distance between the vehicle and the agent in the first state is determined based on the first state information. A second distance between the vehicle and the agent in the second state is determined based on the second state information. The first distance and the second distance are compared to determine the reward for the at least one action. The reward is greater when the second distance meets the first distance. At least one weight of the neural network is adjusted by the at least one processor based on the reward for the at least one action.

By virtue of the implementation of systems, methods, and computer program products described herein, techniques for learning to identify safety-critical scenarios for an autonomous vehicle include the following advantages. The techniques can be used to learn adversarial but reasonable actions that other agents can perform so as to force out edge case scenarios. Since perception degradation, localization degradation, or other forms of system degradation may be rare, drawing such instances out in simulation is critical to evaluate reasonable worst case possible failures of the autonomous vehicle system. The technique can be scaled to many scenarios, where computational benefits may be realized over alternatives such as uniform sampling or covering arrays in high dimensional scenario parameterizations. As different perception degradation situations are discovered, the situations can be added to one of the actions to search for new edge case scenarios. This, in turn, can lead to more accurate training of machine learning models involved in the operation of an autonomous vehicle. The identified test scenarios may also be used to verify behavior of an autonomous vehicle operation in the presence of system degradation, providing a more holistic safety analysis than alternatives focused only on fully observable ego and agent locations. Review of ego behavior in these difficult situations may assist in verifying that certain safety standards are met (e.g., safety of the intended functionality as per ISO 21448). Note also that behavioral compliance verification is broadly applicable to any autonomous system and agnostic to the methods implemented for the autonomous vehicle's planning and decision making (machine learning based or otherwise).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited look-ahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
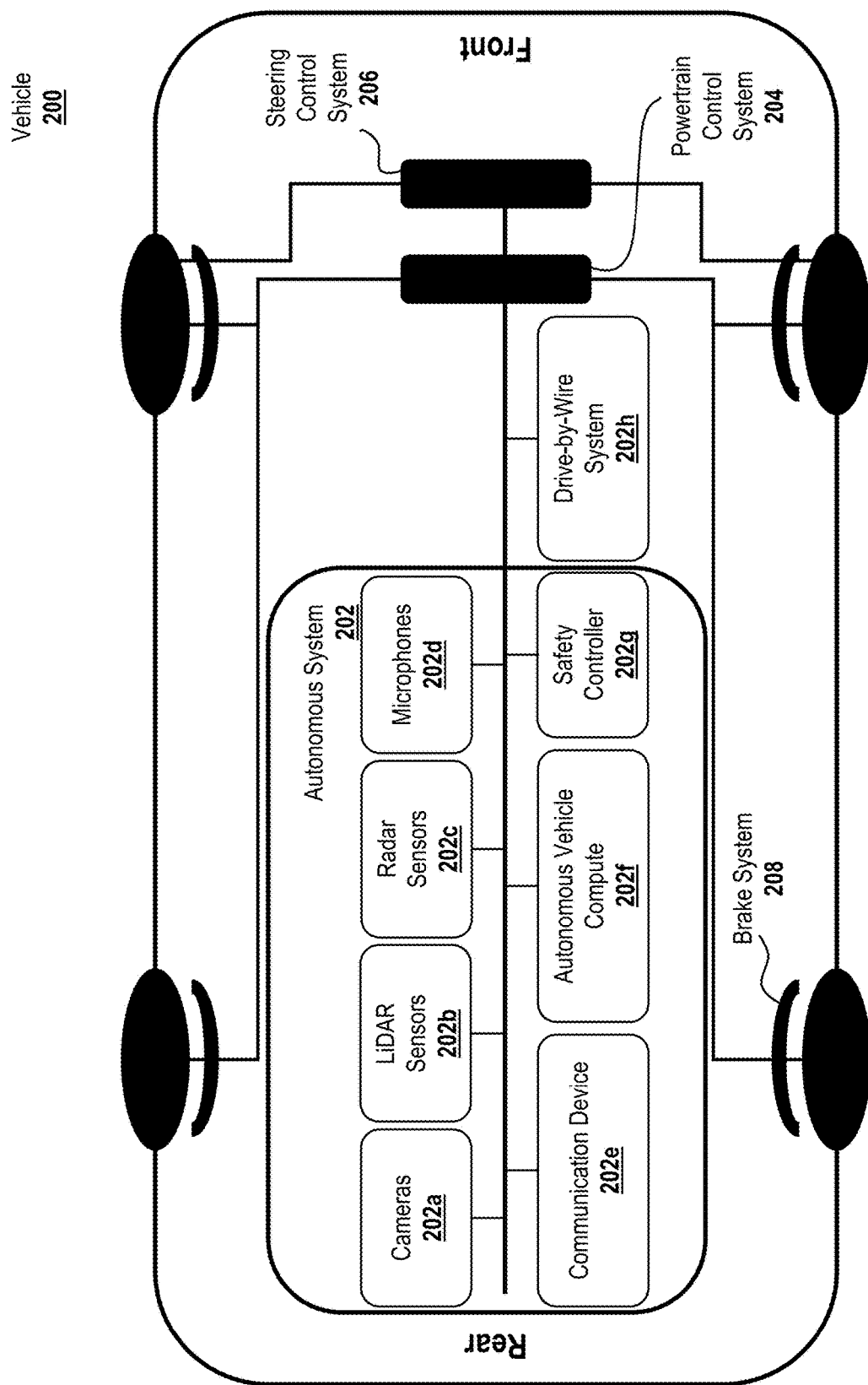
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
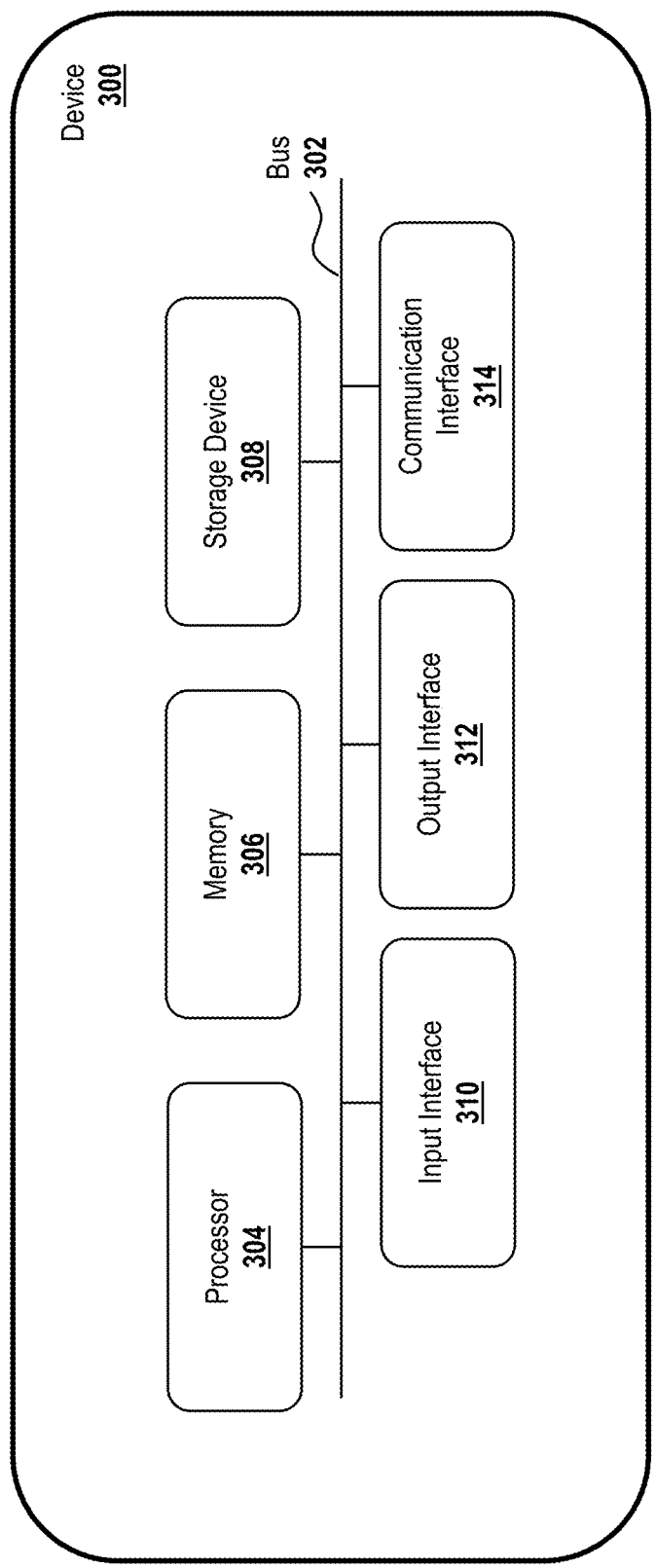
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one component of the vehicle 200, and/or one or more devices of network 112 (e.g., one or more devices of a system of network 112). In some embodiments, one or more devices of vehicles 102 (e.g., one or more devices of a system of vehicles 102), and/or one or more devices of network 112

(e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module (or an engine) is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
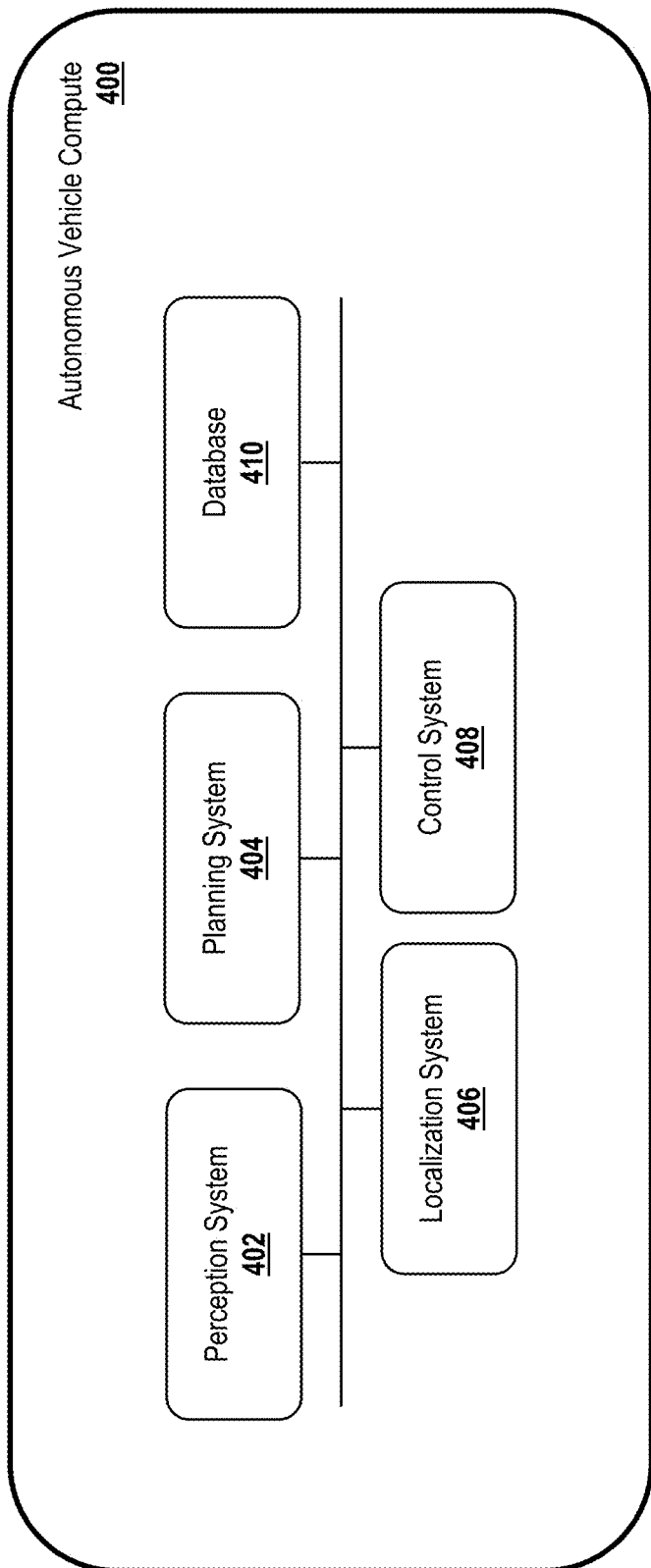
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one auto-encoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
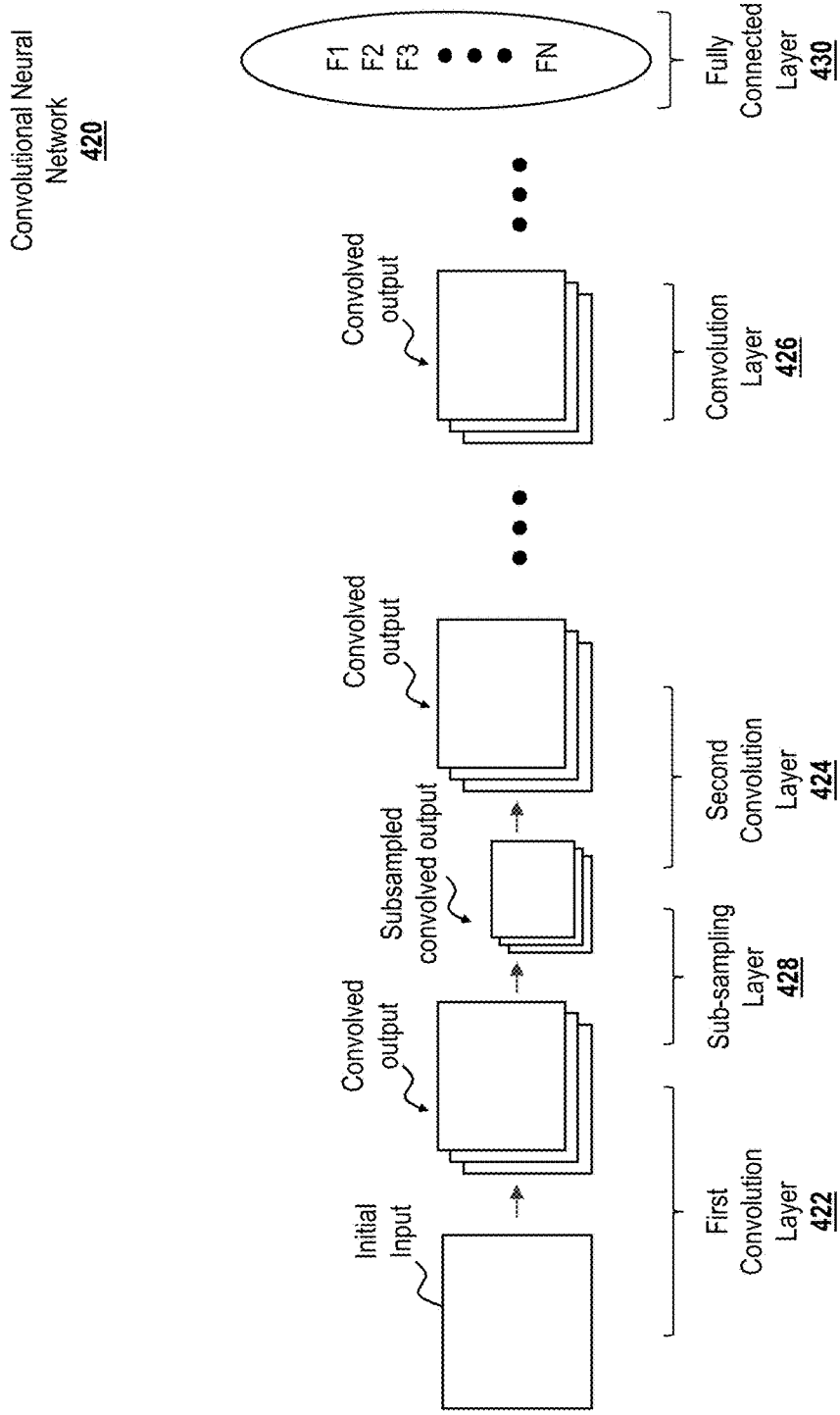
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
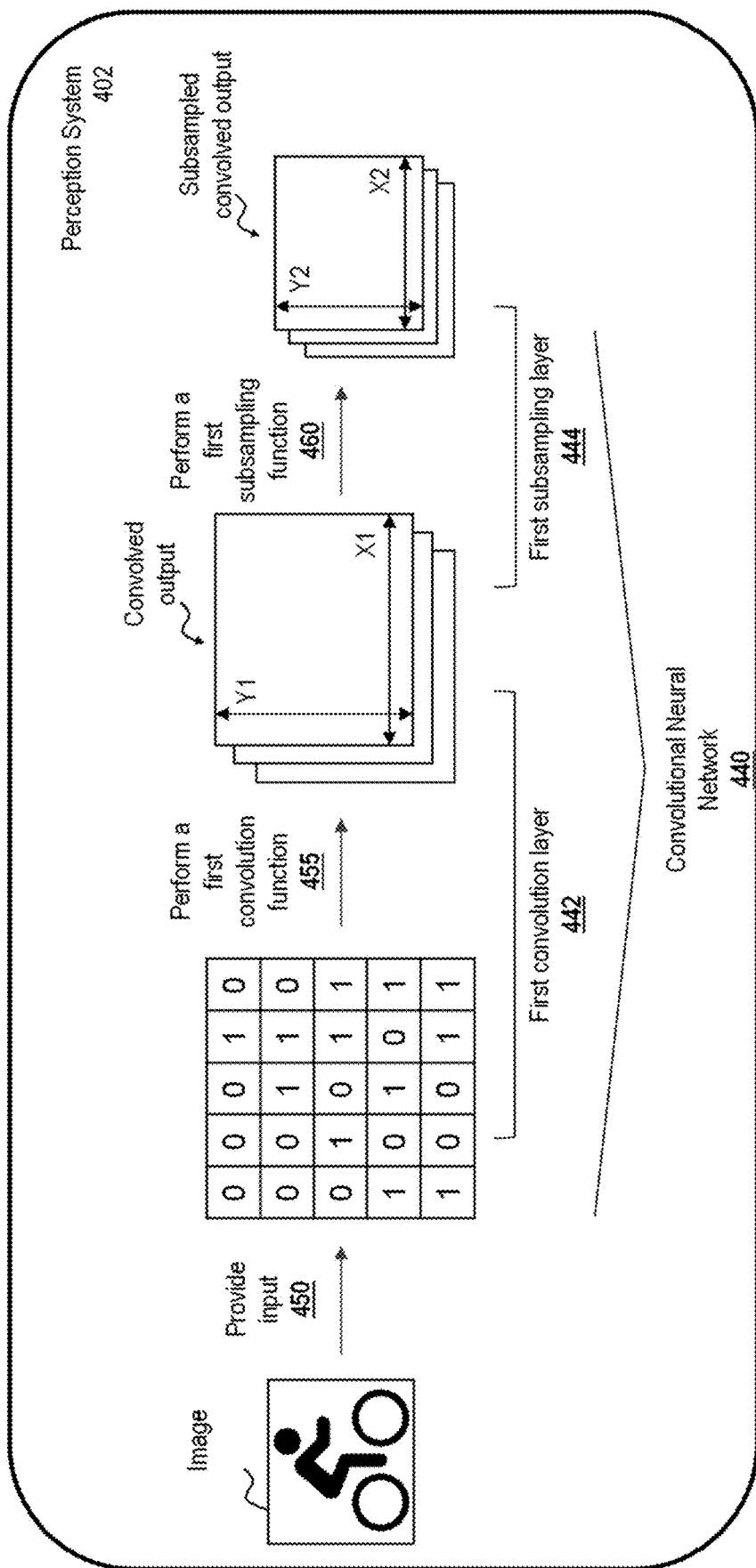
FIGS. 4C and 4D are diagrams illustrating example operation of a CNN.
Figure 4D:
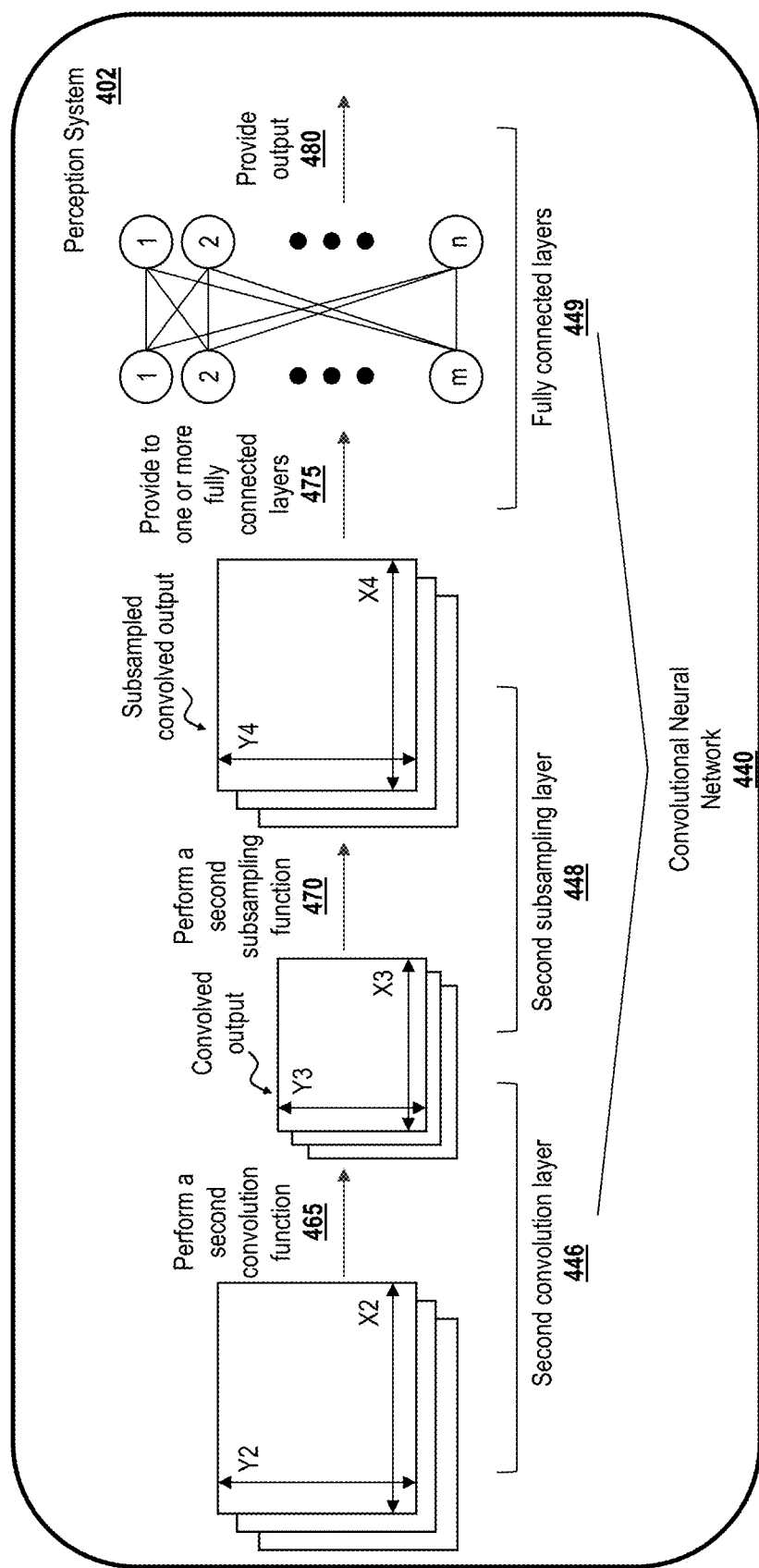

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

In some embodiments, the CNN 440 can be updated (or expanded) over time during the development of the AV (e.g., the vehicle 200). In some embodiments, updating the CNN 440 can include using a simulator to identify scenarios that accurately capture perception degradation which brings the AV just outside of its operational envelope. For example, the AV's perception system (for example, perception system 402) may degrade in multiple ways in which it may be difficult to know how perception degradation affects a planner (e.g., the planner system 404) of the AV. An example of perception degradation is associated with object flicker. For example, depending on the AV's current environment (e.g., environment 100) and whatever maneuver the AV is executing, perception degradation can occur at a particular moment and can bring the AV out of its normal operational envelope into an unsafe state. This can happen, for example, when a condition exists in the environment that has not previously been incorporated into the perception system.

In some embodiments, a goal of updating the CNN 440 can include constructing edge case scenarios from the viewpoint of other agents (for example, pedestrians, bicycles, motorcycles, or another vehicles). The edge case scenarios can be used as additions to the CNN 440, for example. Identifying the edge case scenarios can include using a reinforcement learning process to identify a right policy, e.g., how the AV should react safely to navigate through a situation, such as an action (e.g., moving, or even being present) by an agent. In some embodiments, perception degradation is one of the agent's possible actions that can allow an agent to collide with the AV. In some embodiments, actions of agents can include normal behavioral actions (such as moving in a particular direction and at a particular speed) and perception degradation (e.g., performing an action not yet considered by the perception system). In some embodiments, a sequence of actions can be determined which will result in generating an edge case scenario (e.g., a scenario that puts the AV just outside of the operational envelope).

Figure 5:
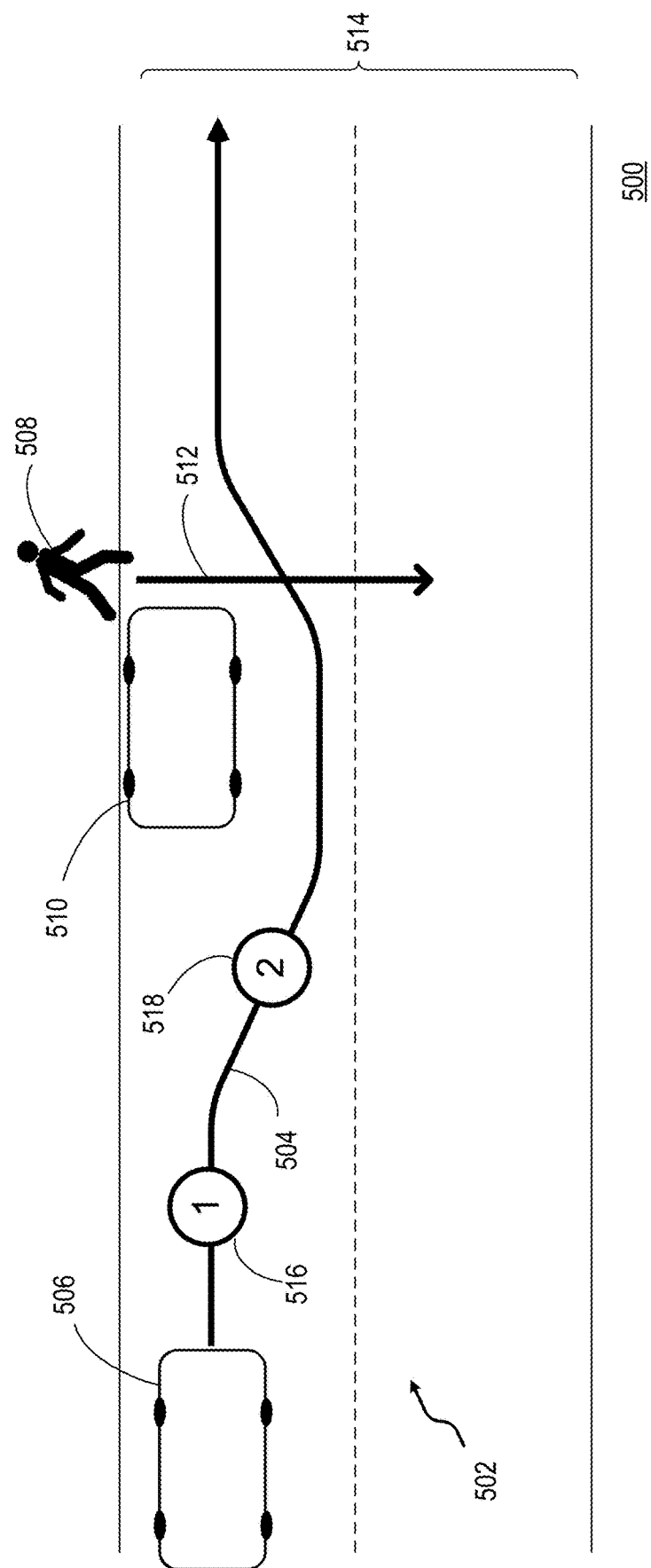
FIG. 5 is a diagram of an implementation of a process for learning to identify safety-critical scenarios for an autonomous vehicle.

Referring now to FIG. 5, illustrated is a diagram of an implementation 500 of a process for learning to identify safety-critical scenarios for an autonomous vehicle. For example, the planning system 404 may fail to plan a safe route for the AV due to an occurrence of a situation that is not recognized by the perception system 402. In some embodiments, implementation 500 is used to perform, for example, a parked car avoidance maneuver 502 (indicated by a path 504) by an AV 506 to avoid a jaywalker 508. As an example, the jaywalker 508 may be walking out from behind a parked car 510, as generally indicated in FIG. 5 by a direction of movement 512 of the jaywalker 508. In some implementations, the parked car avoidance maneuver 502 occurs, for example, on a roadway 514 after a first state (e.g., a speed and direction at a first location 516) and a second state (e.g., a speed and direction at a second location 518) of the AV 506. In some embodiments, there are other avoidance maneuvers performed by the AV 506 to avoid the jaywalker 508, some of which are determined by techniques of the present disclosure.

Referring to FIG. 5, in some embodiments, a simulator is used to simulate a scenario indicated by actions of the jaywalker 508, e.g., during a parked car avoidance maneuver 502. The simulation in this case is used to simulate a specific perception degradation of object flicker, where an object (e.g., jaywalker 508) momentarily disappears (e.g., from the cameras 202a). For example, the jaywalker 508 that is initially perceived by the AV 506 may momentarily disappear behind the parked car 510 as the AV 506 approaches the parked car 510. In some embodiments, the approach by the AV 506 toward the parked car 510 occurs along various positions along the path 504, including the first location 516 and the second location 518.

In this example, depending on when object flicker occurs (e.g., when the jaywalker 508 momentarily disappears), the object flicker may or may not result in a collision or near-collision by the AV 506. Generally, object flicker at greater distances is less of a safety concern for the AV 506 than object flicker occurring at closer distances to an object. Specifically, object flickering at the second location 518 may be less addressable (e.g., the AV 506 may have limited options for maneuvering to avoid coming into contact with the jaywalker 508) for the AV 506 and other objects than at the first location 516, as the AV 506 moves closer to the parked car 510.

In some implementations, a neural network is used (e.g., by implementation 500) to implement the technology for learning to identify safety-critical scenarios for an autonomous vehicle. In some embodiments, the neural network is a recurrent neural network (RNN). An example of an RNN is a long short-term memory (LSTM). In some embodiments, the RNN is used on the CNN 440 to learn internal weights on the neural network. In some embodiments, such techniques provide an improvement, for example, over brute force techniques in which the search space may be infinite and thus not practical.

In some embodiments, one of the observed metrics which is used as input to the LSTM is rule violation, e.g., proximity to the AV (for example, by a parked car and/or pedestrian). Greater (or higher) values or extents of rule violations may bias the LSTM model to learn that action. In some embodiments, in order to learn the correct weights, the system is subjected to the same scenario over and over again.

Figure 6:
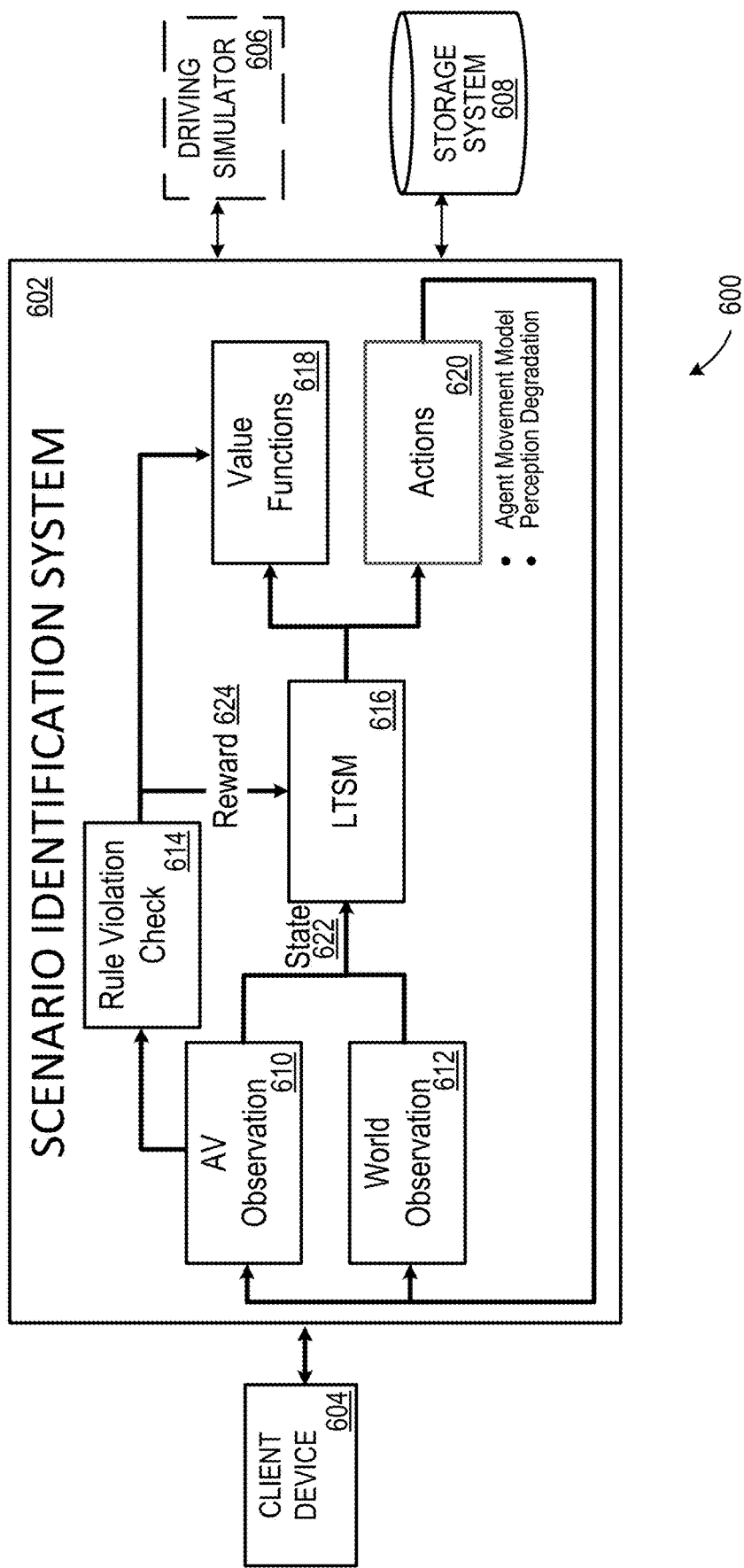
FIG. 6 is a diagram of a scenario learning system used to create or update scenarios for use by an autonomous vehicle.

Referring to FIG. 6, a scenario learning system 600 is used to create or update scenarios for use by an autonomous vehicle. In some embodiments, the scenario learning system 600 includes a scenario identification system 602 in communication with a client device 604, a driving simulator 606, and a storage system 608. In some embodiments, the scenario identification system 602 is used to create or update the CNN 440 for use by the perception system 402. In some embodiments, the client device 604 serves as a front end to the scenario identification system 602, allowing a user to control and review outputs from the scenario identification system 602. In some embodiments, the driving simulator 606 runs driving simulations, such as to identify scenarios which put the AV just outside of the operational envelope. In some embodiments, the storage system 608 stores data used by the simulation, including rules used to control the safe operation of the AV.

In some embodiments, the scenario identification system 602 includes an AV observation engine 610 for observing and tracking the actions, including position, heading and speed of the AV 506. In some embodiments, a world observation engine 612 is used to observe and track objects in the environment of the AV 506, including objects in (or having a probability of being in) the path of the AV 506. In some embodiments, a rule violation check engine 614 executes rules corresponding to the operation of the AV 506, such as detecting when an object is close to the AV 506 which may require that the AV 506 navigates around the object. In some embodiments, an LTSM engine 616 executes algorithms associated with neural networks used by the perception system 402. In some embodiments, a value functions engine 618 assigns a value, weight, or other numeric quantity to an edge connecting nodes in a neural network. In some embodiments, the edges are used to identify scenarios that help to improve the operation of the perception system 402. In some embodiments, an actions engine 620 is used to identify actions that occur by objects in or near the path of the AV 506. In some embodiments, a state engine 622 is used to manage states of the AV, including states corresponding to an initial spatiotemporal location, a final goal state, and a subspace of acceptable states in a goal region. In some embodiments, a reward engine 624 is used to manage rewards for different edges of the neural network.

Figure 7:
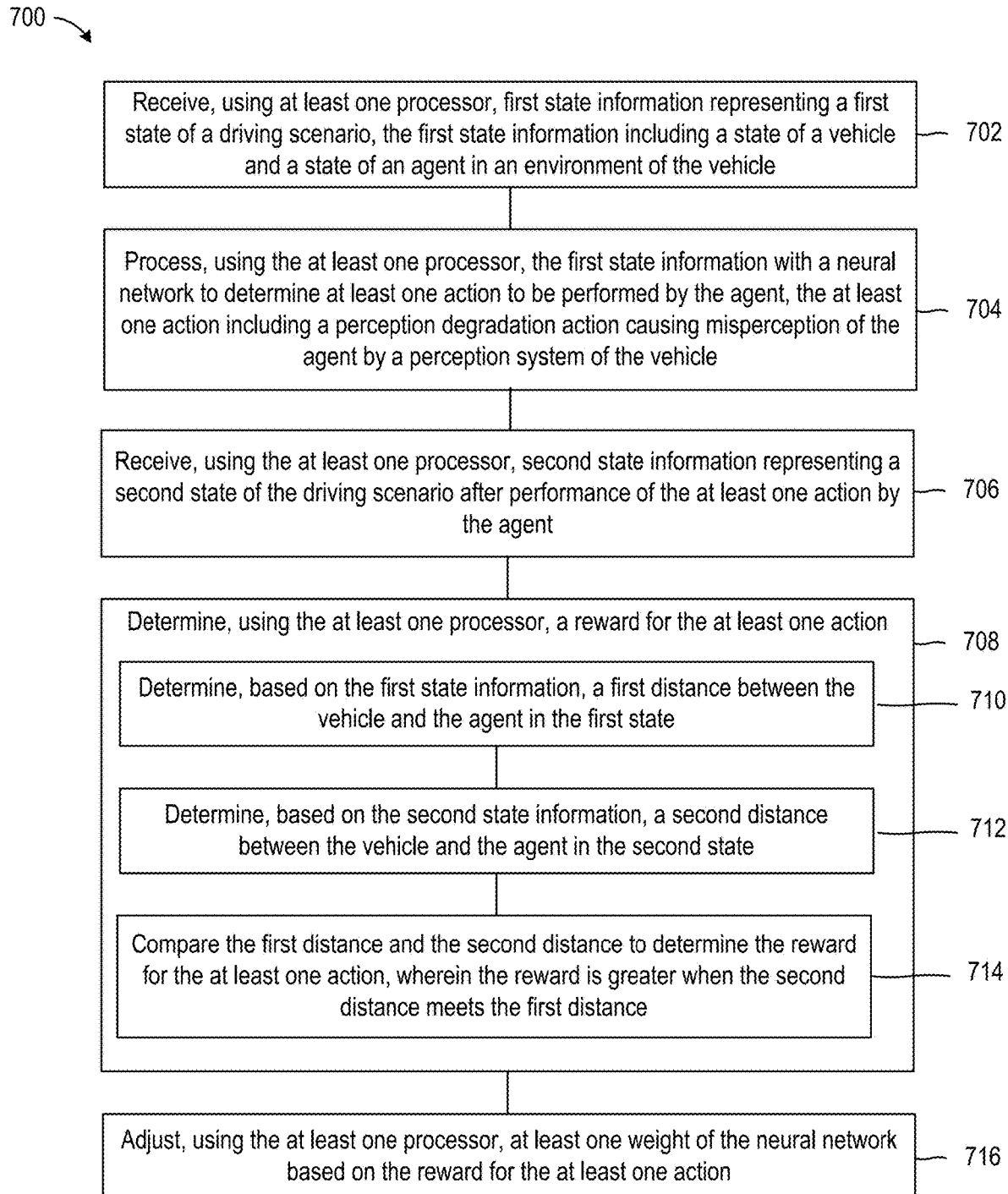
FIG. 7 is a flowchart of a process for learning to identify safety-critical scenarios for an autonomous vehicle.

Referring now to FIG. 7, illustrated is a flowchart of a process 700 for learning to identify safety-critical scenarios for an autonomous vehicle. In some embodiments, one or more of the steps described with respect to process 700 are performed (e.g., completely, partially, and/or the like) by autonomous system 202 (e.g., by one or more systems (or subsystems thereof) of autonomous system 202). Additionally, or alternatively, in some embodiments, one or more steps described with respect to process 700 are performed (e.g., completely, partially, and/or the like) by another device or group of devices separate from or including device 300.

At 702, first state information representing a first state of a driving scenario is received by at least one processor (e.g., processor 304). The first state information includes a state of a vehicle (e.g., AV 506) and a state of an agent (e.g., jaywalker 508) in an environment of the vehicle (e.g., an area the roadway 514 that includes the AV 506 and a planned route of the AV 506). The state of the vehicle includes, for example, the position, velocity, and heading of the vehicle. The state of the agent includes, for example, a position, velocity, and heading of an agent, or an object in the environment of the vehicle, such as a pedestrian, bicycle, motorcycle, or another vehicle.

At 704, the first state information (e.g., a speed and direction at the first location 516) is processed with a neural network by the at least one processor to determine at least one action to be performed by the agent. In some embodiments, the action of the agent is a normal action, such as move forward, backward, left, or right with a specific velocity and/or a perception degradation action. In some embodiments, the perception degradation action includes a missed perception of the agent by the perception system of the vehicle (e.g., flicker), a misclassification of the agent by the perception system of the vehicle (e.g., as a bicycle instead of a pedestrian), or a mischaracterization of one or more features of the agent by the perception system of the vehicle (e.g., a mischaracterization of the vehicle's position, size, and/or heading).

The at least one action includes a perception degradation action causing misperception of the agent by a perception system of the vehicle, such as the jaywalker 508 presenting a danger of walking into the roadway 514 into the path of the AV 506. In some embodiments, the misperception is, for example, an agent action inducing object flicker, object misclassification, position error, size error, or heading error.

In some embodiments, the first state information is processed using a driving model to determine at least one action to be performed by the vehicle, where the second state information represents the second state of the driving scenario after performance of the at least one action by the vehicle, e.g., a change in direction and/or in speed of the AV 506 between locations 516 and 518. In some embodiments, the neural network is implemented as a long short-term memory (LSTM), and the first state information represents the first state and at least one state occurring before the first state. For example, in some embodiments, the autonomous system 202 uses information about states of the AV 506 that occur before the first position of the AV before the AV 506 reaches the first location 516 or between the first location 516 and the second location 518.

At 706, second state information representing a second state (e.g., a speed and direction at the second location 518) of the driving scenario is received by the at least one processor (e.g., processor 304) after performance of the at least one action by the agent. For example, the jaywalker 508 may take steps along the direction of movement 512 toward the path of the oncoming AV 506.

At 708, a reward for the at least one action is determined by the at least one processor. In some embodiments, the reward is, for example, an instantaneous or cumulative value determined in accordance with a reward function used to reinforce (or discourage) the agent to take a particular action in a given state. As an example, in some embodiments, the reward engine 624 updates reward information on different edges of the neural network based on the action taken by the AV 506 in response to the jaywalker 508. In some embodiments, determining a reward for the at least one action includes steps 710-714.

At 710, a first distance between the vehicle and the agent in the first state is determined based on the first state information. As an example, in some embodiments, the autonomous system 202 determines a distance between the AV 506 (e.g., at the first location 516) and the jaywalker 508.

At 712, a second distance between the vehicle and the agent in the second state is determined based on the second state information. For example, the second distance is a distance from the second first location 518 to the jaywalker 508.

At 714, the first distance and the second distance are compared to determine the reward for the at least one action. The reward is greater when the second distance meets the first distance. As an example, if the vehicle is closer to a collision as a result of performing the selected action in a given state, then that action is rewarded for the given state.

In some embodiments, determining the reward for the at least one action includes determining similarity metrics for actions. For example, in some embodiments, information is received that is indicative of a previous action taken by the agent in the first state during a previous execution of the driving scenario. In some embodiments, the at least one action by the agent is compared with the previous action to determine a dissimilarity metric between the at least one action and the previous action. In some embodiments, the reward is determined based on the dissimilarity metric, where the reward is greater when the dissimilarity metric indicates that there is a greater dissimilarity between the at least one action and the previous action. For example, higher rewards are given to actions (or sets of actions) with a greater dissimilarity relative to other solutions found for the same driving scenario.

In some embodiments, determining the reward for the at least one action further includes using occlusion distances. A first occlusion distance between the agent and an occlusion point for the vehicle in the first state is determined. A second occlusion distance between the agent and the occlusion point for the vehicle in the second state is determined. The first occlusion distance and the second occlusion distance are compared to determine the reward for the at least one action, where the reward is greater when the second occlusion distance is less than the first occlusion distance.

In some embodiments, a future reward for a future perception degradation action by the agent is reduced in response to the at least one action including the perception degradation action. In some embodiments, the future reward is reduced each time the agent performs a perception degradation action, so as to reduce the future reward for such an action. The future reward is reduced, for example, by reducing a weight on an edge on the CNN 420.

At 716, the least one weight of the neural network is adjusted by the at least one processor based on the reward for the at least one action. For example, in some embodiments, the autonomous system 202 represents possible actions that the agent takes in various states represented by the CNN. In some embodiments, determining the reward for the at least one action includes distance-based comparisons and adjustments. In some embodiments, information is received that is indicative of a lowest recorded distance between the vehicle and the agent during a previous execution of the driving scenario. In some embodiments, the second distance is compared with the lowest recorded distance for the driving scenario. In some embodiments, the reward for the at least one action is increased in response to a determination that the second distance is less than the lowest recorded distance. In some embodiments, the reward for each action by the agent in the driving scenario is increased before the at least one action in response to determining that the second distance is less than the lowest recorded distance. For example, if the overall distance between the agent and the vehicle is lower than the recorded lowest distance from previous executions of the driving scenario, then the reward is increased for all actions taken.

In some embodiments, testing occurs for a driving model of the vehicle as the vehicle approaches the agent. In some embodiments, the driving model of the vehicle is an autonomous vehicle software stack. In some embodiments, a determination is made that the second distance between the vehicle and the agent in the second state is less than a threshold distance. For example, in some embodiments, the threshold distance represents a distance in which a collision or near-collision has occurred between the vehicle and the agent. In some embodiments, in response to determining that the second distance is less than the threshold distance, a test for a driving model is generated based on at least one of the driving scenario, the first state information, or the second state information.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   receiving, using at least one processor, first state information representing a first state of a driving scenario, the first state information including a state of a vehicle and a state of an agent in an environment of the vehicle;
   processing, using the at least one processor, the first state information with a neural network to determine at least one action to be performed by the agent, the at least one action including a perception degradation action causing misperception of the agent by a perception system of the vehicle, including determining the perception degradation that includes a missed perception of the agent by the perception system;
   receiving, using the at least one processor, second state information representing a second state of the driving scenario after performance of the at least one action by the agent;
   determining, using the at least one processor, a reward for the at least one action, including:
      determining, based on the first state information, a first distance between the vehicle and the agent in the first state;
      determining, based on the second state information, a second distance between the vehicle and the agent in the second state; and
      comparing the first distance and the second distance to determine the reward for the at least one action, wherein the reward is greater when the second distance meets the first distance; and
   adjusting, using the at least one processor, at least one weight of the neural network based on the reward for the at least one action.

2. The method of claim 1, further comprising:
   processing the first state information using a driving model to determine at least one action to be performed by the vehicle, wherein the second state information represents the second state of the driving scenario after performance of the at least one action by the vehicle.

3. The method of claim 1, further comprising:
   determining that the second distance between the vehicle and the agent in the second state is less than a threshold distance; and
   in response to determining that the second distance is less than the threshold distance, generating a test for a driving model based on at least one of the driving scenario, the first state information, or the second state information.

4. The method of claim 1, wherein the neural network comprises a long short-term memory (LSTM), and wherein the first state information represents the first state and at least one state occurring before the first state.

5. The method of claim 1, further comprising:

reducing a future reward for a future perception degradation action by the agent in response to the at least one action including the perception degradation action.

6. The method of claim 1, wherein determining the reward for the at least one action further comprises:

receiving information indicative of a lowest recorded distance between the vehicle and the agent during a previous execution of the driving scenario;

comparing the second distance with the lowest recorded distance for the driving scenario; and increasing the reward for the at least one action in response to a determination that the second distance is less than the lowest recorded distance.

7. The method of claim 6, further comprising:

increasing a reward for each action by the agent in the driving scenario before the at least one action in response to determining that the second distance is less than the lowest recorded distance.

8. The method of claim 1, wherein determining the reward for the at least one action further comprises:

receiving information indicative of a previous action taken by the agent in the first state during a previous execution of the driving scenario;

comparing the at least one action by the agent with the previous action to determine a dissimilarity metric between the at least one action and the previous action; and determining the reward based on the dissimilarity metric, wherein the reward is greater when the dissimilarity metric indicates that there is a greater dissimilarity between the at least one action and the previous action.

9. The method of claim 1, wherein determining the reward for the at least one action further comprises:

determining a first distance between the agent and an object or pedestrian for the vehicle in the first state;

determining a second distance between the agent and the object or pedestrian for the vehicle in the second state; and comparing the first distance and the second distance to determine the reward for the at least one action, wherein the reward is greater when the second distance is less than the first distance.

10. A non-transitory computer-readable storage medium comprising instructions which, when executed by at least one processor, cause the at least one processor to perform operations comprising:

receiving first state information representing a first state of a driving scenario, the first state information including a state of a vehicle and a state of an agent in an environment of the vehicle;

processing the first state information with a neural network to determine at least one action to be performed by the agent, the at least one action including a perception degradation action causing misperception of the agent by a perception system of the vehicle, including determining the perception degradation that includes a missed perception of the agent by the perception system;

receiving second state information representing a second state of the driving scenario after performance of the at least one action by the agent;

determining a reward for the at least one action, including:

determining, based on the first state information, a first distance between the vehicle and the agent in the first state;

determining, based on the second state information, a second distance between the vehicle and the agent in the second state; and comparing the first distance and the second distance to determine the reward for the at least one action, wherein the reward is greater when the second distance is less than the first distance; and adjusting at least one weight of the neural network based on the reward for the at least one action.

11. The non-transitory computer-readable storage medium of claim 10 comprising instructions which, when executed by the at least one processor, cause the at least one processor to perform operations comprising:

processing the first state information using a driving model to determine at least one action to be performed by the vehicle, wherein the second state information represents the second state of the driving scenario after performance of the at least one action by the vehicle.

12. The non-transitory computer-readable storage medium of claim 10 comprising instructions which, when executed by the at least one processor, cause the at least one processor to perform operations comprising, further comprising:

determining that the second distance between the vehicle and the agent in the second state is less than a threshold distance; and in response to determining that the second distance is less than the threshold distance, generating a test for a driving model based on at least one of the driving scenario, the first state information, or the second state information.

13. The non-transitory computer-readable storage medium of claim 10, wherein the neural network comprises a long short-term memory (LSTM) recurrent neural network (RNN), and wherein the first state information represents the first state and at least one state occurring before the first state.

14. The non-transitory computer-readable storage medium of claim 10 comprising instructions which, when executed by the at least one processor, cause the at least one processor to perform operations comprising:

reducing a future reward for a future perception degradation action by the agent in response to the at least one action including the perception degradation action.

15. The non-transitory computer-readable storage medium of claim 10, wherein determining the reward for the at least one action further comprises:

receiving information indicative of a lowest recorded distance between the vehicle and the agent during a previous execution of the driving scenario;

comparing the second distance with the lowest recorded distance for the driving scenario; and increasing the reward for the at least one action in response to a determination that the second distance is less than the lowest recorded distance.

16. The non-transitory computer-readable storage medium of claim 15 comprising instructions which, when executed by the at least one processor, cause the at least one processor to perform operations comprising:

increasing a reward for each action by the agent in the driving scenario before the at least one action in response to determining that the second distance is less than the lowest recorded distance.

17. The non-transitory computer-readable storage medium of claim 10, wherein determining the reward for the at least one action further comprises:

receiving information indicative of a previous action taken by the agent in the first state during a previous execution of the driving scenario;

comparing the at least one action by the agent with the previous action to determine a dissimilarity metric between the at least one action and the previous action; and determining the reward based on the dissimilarity metric, wherein the reward is greater when the dissimilarity metric indicates that there is a greater dissimilarity between the at least one action and the previous action.

18. The non-transitory computer-readable storage medium of claim 10, wherein determining the reward for the at least one action further comprises:

determining a first distance between the agent and an object or pedestrian for the vehicle in the first state;

determining a second distance between the agent and the object or pedestrian for the vehicle in the second state; and comparing the first distance and the second distance to determine the reward for the at least one action, wherein the reward is greater when the second distance is less than the first distance.

19. A system, comprising:

computer-readable media storing computer-executable instructions; and at least one processor communicatively coupled to the computer-readable media, the at least one processor configured to execute the computer-executable instructions to perform operations comprising:

receiving first state information representing a first state of a driving scenario, the first state information including a state of a vehicle and a state of an agent in an environment of the vehicle;

processing the first state information with a neural network to determine at least one action to be performed by the agent, the at least one action including a perception degradation action causing misperception of the agent by a perception system of the vehicle, including determining the perception degradation that includes a missed perception of the agent by the perception system;

receiving second state information representing a second state of the driving scenario after performance of the at least one action by the agent;

determining a reward for the at least one action, including:

determining, based on the first state information, a first distance between the vehicle and the agent in the first state;

determining, based on the second state information, a second distance between the vehicle and the agent in the second state; and comparing the first distance and the second distance to determine the reward for the at least one action, wherein the reward is greater when the second distance is less than the first distance; and adjusting at least one weight of the neural network based on the reward for the at least one action.

20. A method, comprising:

receiving, using at least one processor, first state information representing a first state of a driving scenario, the first state information including a state of a vehicle and a state of an agent in an environment of the vehicle;

processing, using the at least one processor, the first state information with a neural network to determine at least one action to be performed by the agent, the at least one action including a perception degradation action causing misperception of the agent by a perception system of the vehicle, including determining the perception degradation that includes a misclassification of the agent by the perception system of the vehicle or a mischaracterization of one or more features of the agent by the perception system;

receiving, using the at least one processor, second state information representing a second state of the driving scenario after performance of the at least one action by the agent;

determining, using the at least one processor, a reward for the at least one action, including:

determining, based on the first state information, a first distance between the vehicle and the agent in the first state;

determining, based on the second state information, a second distance between the vehicle and the agent in the second state; and comparing the first distance and the second distance to determine the reward for the at least one action, wherein the reward is greater when the second distance meets the first distance; and adjusting, using the at least one processor, at least one weight of the neural network based on the reward for the at least one action.

* * * * *